United States Patent
Haardt et al.

(10) Patent No.: US 7,555,266 B2
(45) Date of Patent: Jun. 30, 2009

(54) METHOD AND COMMUNICATION SYSTEM FOR ESTIMATING AN ERROR COVARIANCE MATRIX FOR THE DOWNLINK IN CELLULAR MOBILE RADIO TELEPHONE NETWORKS WITH ADAPTIVE ANTENNAS

(75) Inventors: Martin Haardt, Geraberg (DE); Christoph Mecklenbraeuker, Vienna (AT)

(73) Assignee: Nokia Siemens Networks GmbH & Co. KG, Munich (DE)

( * ) Notice: Subject to any disclaimer, the term of this patent is extended or adjusted under 35 U.S.C. 154(b) by 511 days.

(21) Appl. No.: 10/276,922

(22) PCT Filed: May 22, 2001

(86) PCT No.: PCT/DE01/01969

§ 371 (c)(1), (2), (4) Date: Nov. 22, 2002

(87) PCT Pub. No.: WO01/91324

PCT Pub. Date: Nov. 29, 2001

(65) Prior Publication Data

US 2003/0162501 A1 Aug. 28, 2003

(30) Foreign Application Priority Data

May 22, 2000 (DE) ............................... 100 25 287

(51) Int. Cl.
*H04B 1/00* (2006.01)
*H04B 15/00* (2006.01)
*H04B 17/00* (2006.01)
*H04B 1/04* (2006.01)

(52) U.S. Cl. .................. 455/63.1; 455/67.13; 455/114.2

(58) Field of Classification Search ............... 455/63.1, 455/63.4, 67.11, 67.13, 114.2, 115.1, 115.3, 455/522, 13.4, 127.1, 127.5, 422.1

See application file for complete search history.

(56) References Cited

U.S. PATENT DOCUMENTS 6,009,124 A * 12/1999 Smith et al. ................. 375/267

(Continued)

FOREIGN PATENT DOCUMENTS

DE 198 03 188 A1 7/1999

(Continued)

OTHER PUBLICATIONS

Weckerle et al., "Estimation and Utilization of Spatial Intercell Interference Covariance Matrices in Multi-Antenna TD-CDMA-Systems", 10th International Symposium on Personal, Indoor and Mobile Radio Communications (PIMRC '99), Osaka, Japan Sep. 12-15, 1999, pp. 1198-1202.

(Continued)

*Primary Examiner*—Eugene Yun
(74) *Attorney, Agent, or Firm*—Staas & Halsey LLP

(57) ABSTRACT

Data is transmitted in a radio communication system having two or more base stations that are located in the network and having additional radio stations, which are each connected to one of the base stations via radio interfaces. At least one first base station has an antenna array with a multitude of antenna elements and with a signal processing device for the directional transmitting-receiving of data. The first base station temporally overlays data to a radio station, which is connected to the base station, for the transmission of data from an external base station to an external radio station connected thereto. The transmission of data from the first base station is also received from the external radio station. The objective is to reduce the amount of disturbance to the external radio station caused by transmissions from the base station in the downlink direction. To this end, the transmitting power of the antenna array of the base station is reduced in the direction toward the external radio station after a transmission of a training signal of the transmitted signal for the external radio station and after the reception of an assignable training signal of the external radio station.

22 Claims, 3 Drawing Sheets

U.S. PATENT DOCUMENTS

| | | | |
|---|---|---|---|
| 6,044,067 A * | 3/2000 | Suzuki | 370/252 |
| 6,314,304 B1 * | 11/2001 | Uesugi | 455/562.1 |
| 6,522,888 B1 * | 2/2003 | Garceran et al. | 455/456.3 |
| 6,782,255 B1 * | 8/2004 | Ranta et al. | 455/423 |

FOREIGN PATENT DOCUMENTS

| | | | |
|---|---|---|---|
| EP | 0 866 568 A1 | 9/1998 | |
| EP | 0 899 896 A1 | 3/1999 | |
| WO | WO 97/44919 | 11/1997 | |
| WO | WO 01/31812 A1 | 5/2001 | |

OTHER PUBLICATIONS

David et al., "Digitale Mobilfunksysteme", 1996, pp. 284-286.

Eberspächer t al., "GSM Global System for Mobile Communication", 1997, pp. 22-26.

* cited by examiner

METHOD AND COMMUNICATION SYSTEM FOR ESTIMATING AN ERROR COVARIANCE MATRIX FOR THE DOWNLINK IN CELLULAR MOBILE RADIO TELEPHONE NETWORKS WITH ADAPTIVE ANTENNAS

CROSS REFERENCE TO RELATED APPLICATIONS

This application is based on and hereby claims priority to German Application No. 100 252 87.7 filed on May 22, 2000, the contents of which are hereby incorporated by reference.

BACKGROUND OF THE INVENTION

The invention relates to directionally dependent control of the power for the downlink in a cellular radio communication network with adaptive antennas.

In radio communication systems, information (for example speech, image information or other data) is transmitted with the aid of electromagnetic waves via an air interface between transmitting and receiving stations (base station and subscriber station, respectively). The emission of the electromagnetic waves is performed in this case with the aid of carrier frequencies that are in the frequency band provided on the respective system. In the case of the GSM (Global System for Mobile Communication), the carrier frequencies are at 900, 1800 and 1900 MHz. Frequencies in the frequency band of approximately 2000 MHz are provided for future mobile radio systems using CDMA or TD/CDMA transmission methods via the radio interface, for example the UMTS (Universal Mobile Telecommunication System) or other 3rd generation systems.

The data transmission takes place via frames in the case of these radio communication systems. A division of a broadband frequency domain into a plurality of time slots of equal time duration is provided in the case of a TDMA component (TDMA: Time Division Multiple Access). The time slots are used partially in the downlink DL (downlink from base station to subscriber station), and partially in the uplink UL (uplink from subscriber station to base station). One or more switching points are situated therebetween. The same is repeated for further carrier frequencies. Information of a plurality of connections is transmitted in radio blocks within the time slots. Radio blocks for user data transmission currently include sections with data in which training sequences or midambles known at the receiving end are embedded.

The switching points can be defined synchronously in all cells of the radio communication system. In this case, a time slot in the overall radio communication system is used exclusively in the uplink UL or exclusively in the downlink DL. Additional flexibility is achieved by defining the switching points asynchronously. In this case, some cells of the radio communication system use one time slot for UL and others for DL.

Because the distance between transmitter and receiver frequently fluctuates strongly during operation, it is desired to match the transmit power over up to a plurality of orders of magnitude, in order to keep the ratio of energy per bit/noise-power density or the ratio of signal/interferer or carrier power/ interference power in the limit or target range. On the one hand, the receive power must be at a minimum level that is required for the desired surface quality, but on the other hand as little interference as possible is to be produced.

DE 198 03 188 discloses a method and a base station for, in particular, TDMA/CDMA transmission methods (CDMA: Code Division Multiple Access), in the case of which the signals transmitted from the base station in the downlink are specifically amplified in the direction of the assigned subscriber station, and attenuated in the other directions. For this purpose, spatial covariance matrices are estimated in the base station for each subscriber station in order to determine amplifying interference from the signal received in the uplink, and thereafter a beam-shaping vector is calculated which maximizes the signal/noise ratio at the receiver. A general eigenvalue problem is solved in this case without iteration. Thereupon, transmitted signals are weighted with the beam shaping vector for the corresponding radio link and fed to the antenna element of the antenna arrangement for emission. The covariance matrix is determined from a priori assumptions with the aid of a mathematical model. The base station measures nothing during the transmission to its subscriber station in the corresponding downlink time slot. Consequently, uplink measurements of the training sequences must be used for estimation, in order to estimate the downlink covariance matrix.

In other words, in the case of this method the antenna gain of the antenna arrangement of the base station is maximized in specific directions, which are assigned to the dedicated subscriber stations, by appropriately driving the individual antenna elements of the antenna arrangement. That is to say, the power that is transmitted from an antenna group to an assigned subscriber station is emitted in a maximized fashion by constructive interference in the direction in which this subscriber station is located.

These radio communication systems have a cellular structure in which in each case a base station with at least one transmitting antenna arrangement supplies subscriber stations in a specific radio cell zone. In this case, disturbing interference with subscriber stations of adjacent radio cell zones can arise that are supplied from a neighboring base station. This is the case, in particular, when the base station transmits to a subscriber station assigned to it in a time slot in which the subscriber station in the adjacent radio cell zone receives data from its base station, the adjacent one.

SUMMARY OF THE INVENTION

An object of the invention is to provide a method for reducing the downlink transmit power which disturbs subscriber stations in adjacent cells, and a cellular radio communication network with adaptive antennas for carrying out such a method.

In the case of a method according to the present invention, the interference at foreign subscribers is advantageously minimized by maximizing the transmit power for dedicated subscribers of a transmitting or base station. In this case, the radio waves are directed in the direction of the desired dedicated subscriber stations and, in addition, the transmit power in other directions is minimized.

The use of the method or of the radio communication system is suitable, in particular, for mobile radio networks that use a time division duplex (TDD) method with adaptive antenna groups. In the case of the planned systems, these are, for example, UMTS UTRA-TDD and TD-SCDMA for China.

The use in FDD systems, for example GSM, is possible by means of a frequency transformation that is carried out before the estimated uplink covariance matrices can be used for application as downlinks.

In the case of asynchronous switching points, it is advantageous also to take account of the training signals of those foreign network-side base stations that transmit downlink in an uplink time slot of the base station.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
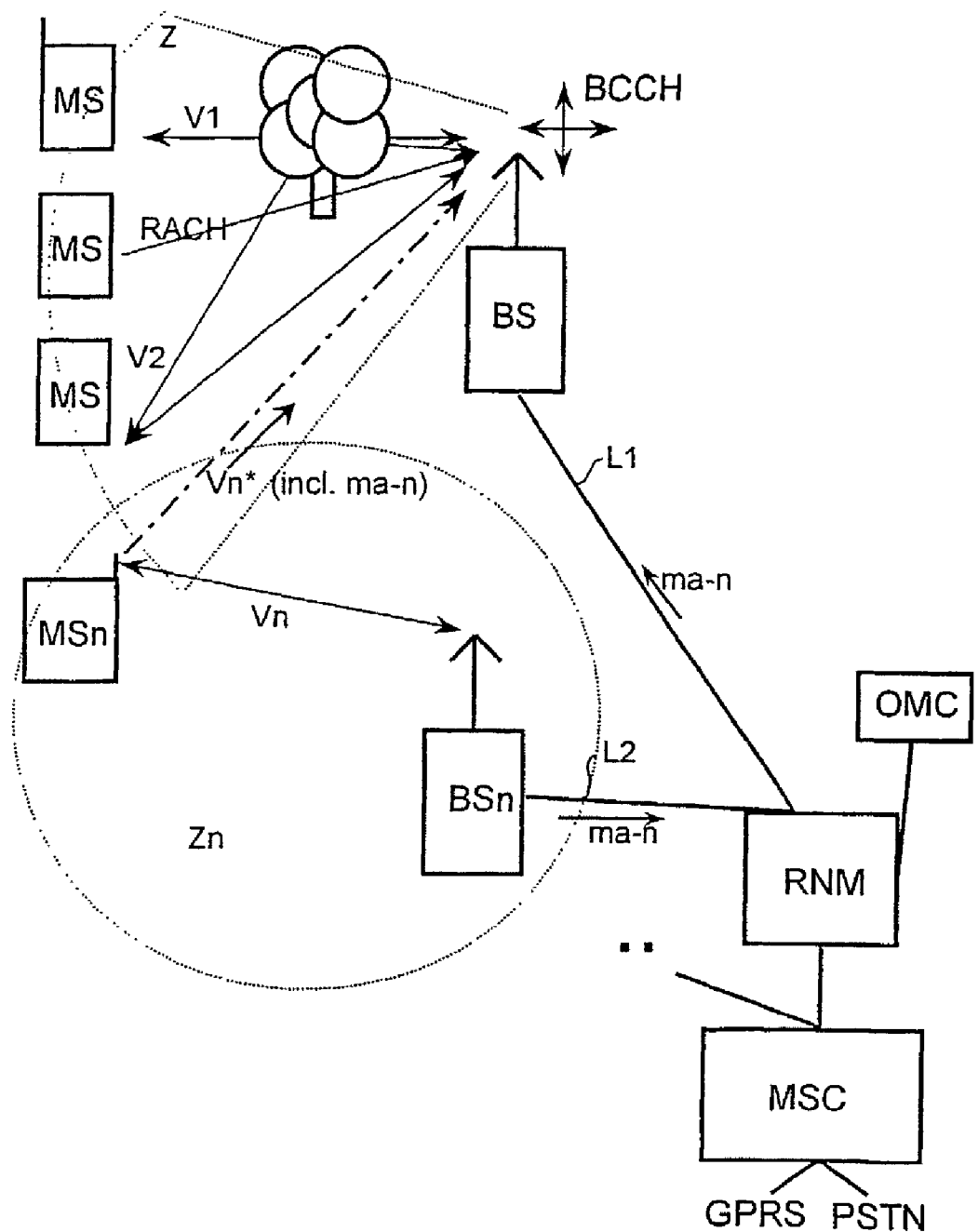
FIG. 1 is a block diagram of a mobile radio system.

Reference will now be made in detail to the preferred embodiments of the present invention, examples of which are illustrated in the accompanying drawings, wherein like reference numerals refer to like elements throughout.

The mobile radio system illustrated in FIG. 1 as an example of a radio communication system includes a multiplicity of mobile switching centers MSC that are networked to one another and/or provide access to a fixed network PSTN or packet data network GPRS. Furthermore, these mobile switching centers MSC are connected to in each case at least one device RNM for allocating radio resources. Each of these devices RNM in turn renders it possible to make a connection to at least one base station BS, here the base stations BS and an adjacent base station BSn. Such a base station BS can set up via an air interface V a connection to subscriber stations, for example mobile stations MS or other types of mobile and stationary terminals. At least one radio cell Z is formed by each base station BS. A plurality of radio cells Z can also be supplied per base station BS in the case of sectorization or of hierarchic cell structures.

Existing connections V1, V2 for transmitting user information and signaling information between subscriber stations MS and a base station BS, as well as a request for resource allocation or a short acknowledgement message in an access channel RACH by a further subscriber station MS are illustrated in FIG. 1 by way of example. The adjacent base station BSn is connected to a further subscriber station that is also denoted below from the point of view of the base station BS foreign to it as foreign or adjacent subscriber station MSn.

Also illustrated is an organization channel (BCCH: Broadcast Control CHannel) that is provided for transmitting user and signaling information with a defined transmit power from each of the base stations BS for all subscriber stations MS.

An operation and maintenance center OMC implements monitoring and maintenance functions for the mobile radio system or for parts thereof. The functionality of this structure can be transferred to other radio communication systems, in particular for subscriber access networks with wireless subscriber access.

Figure 2:
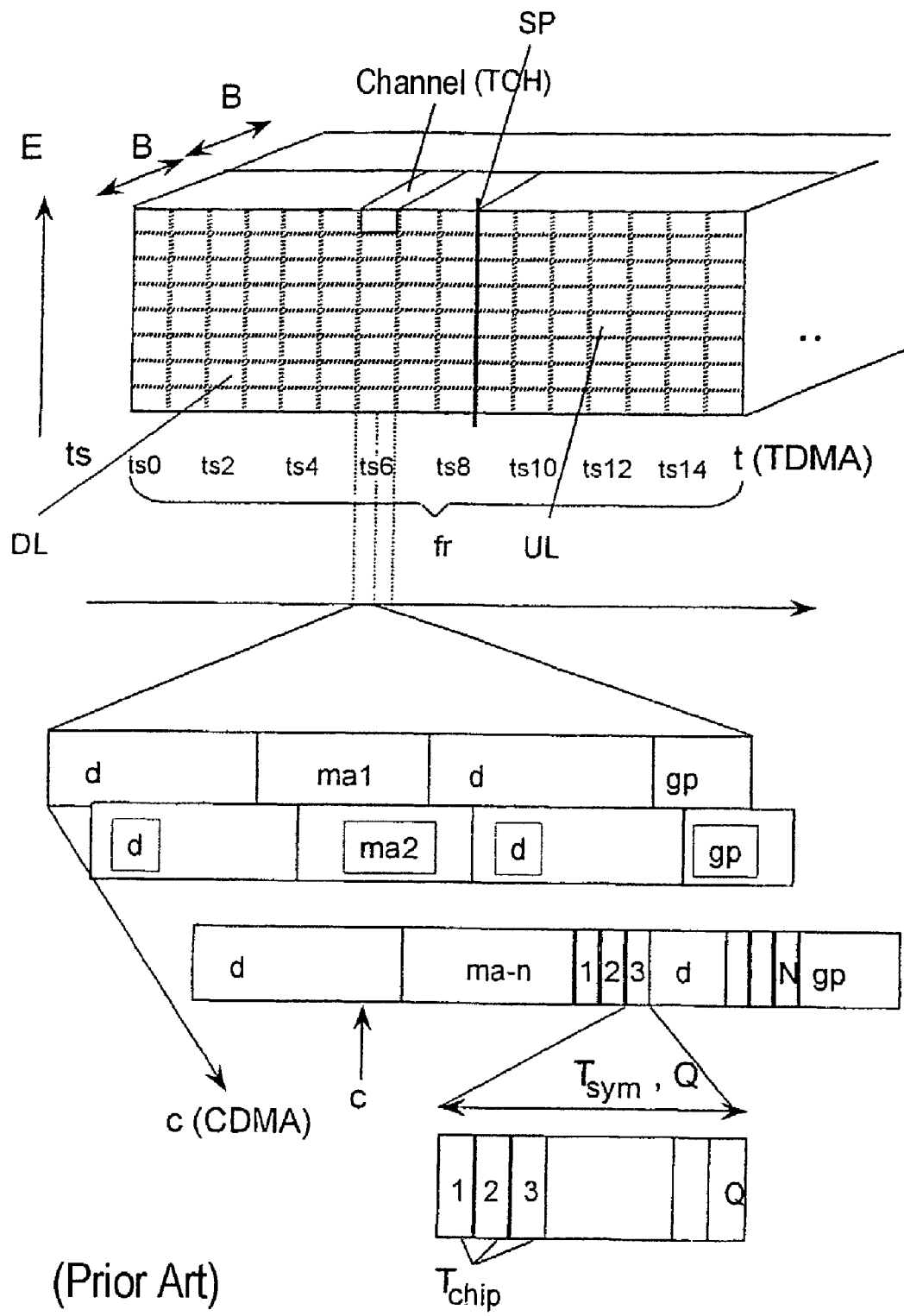
FIG. 2 is the frame structure of a known TDD transmission method.

The frame structure of the radio transmission may be seen from FIG. 2. In accordance with a TDMA component (TDMA: Time Division Multiple Access), a division of a broadband frequency band, for example the bandwidth B=5 MHz, is divided into a plurality of time slots ts of equal time duration, for example 16 time slots ts0 to ts15. A frequency band extends over a frequency domain B. A portion of the time slots ts0 to ts8 is used in the overall radio communication system in the downlink DL, and a portion of the time slots ts9 to ts15 is used in the uplink UL. Situated therebetween are one or more synchronous switching points SP—only one switching point in FIG. 2. In the case of this TDD transmission method, the frequency band for the uplink UL corresponds to the frequency band for the downlink DL. The same is repeated for further carrier frequencies.

Information of a plurality of connections is transmitted in radio blocks within the time slots ts. Function blocks for user data transmission include sections with data d in which training sequences or midambles ma1 to ma-n known at the receiving end are embedded. The data d with 1 ... N symbols are spread individually by connection with a fine structure, a subscriber code c, such that, for example, n connections can be separated at the receiving end by means of these CDMA components (CDMA: Code Division Multiple Access). A physical channel is formed in this case by a frequency band B, a time slot, for example ts6, and a subscriber code c. A plurality of physical resources are generally linked to a logic channel in order to transmit services at high data rates. For example, 8 physical resources are required in each case for the service 144 kbit/s in uplink and downlink.

The spreading of individual symbols of the data d has the effect that Q chips of duration Tchip are transmitted within the symbol duration Tsym. The Q chips in this case form the connection-specific subscriber code c. Furthermore, a guard period gp for compensating different travel times of the signals of the connections is provided within the time slot ts.

Figure 3:
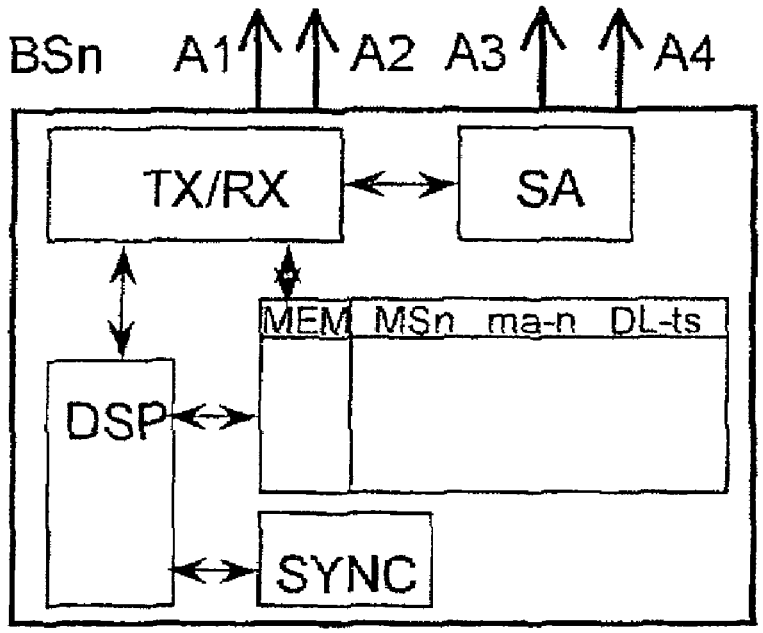
FIG. 3 is a simplified block diagram of a base station.

As may be seen from FIG. 3, the base station BS has a transmitting/receiving device TX/RX that subjects the transmitted signals to be emitted to digital/analog conversion, transforms them from the baseband into the frequency domain B of the emission, and modulates and amplifies the transmitted signals. The amplified signals are then fed to the intelligent and/or adaptive antenna arrangement with the antenna elements A1-A4. A signal generating device SA has previously assembled the transmitted signals in radio blocks and assigned them to the corresponding frequency channel TCH. A signal processing device DSP evaluates received signals received via the antenna arrangement and the transmitting/receiving device TS/RX, and executes a channel estimation.

In order to reduce the interference of the base station BS, also denoted below as interfering base station BS, exerted on the adjacent and disturbed subscriber station MSn, an error covariance matrix is estimated in the disturbing base station BS. While the known covariance matrices serve the purpose of amplifying the transmitted signals in the direction of the communicating subscriber stations MS, the error covariance matrix is formed in order to reduce the transmit power in the direction of the adjacent, disturbed subscriber station(s) MSn.

Correlation signals are transferred to the disturbing base station BS from the adjacent base station BSn, which is connected to or communicates with the subscriber station MSn assigned to it and disturbed. In the case illustrated, the correlation signals are transferred via the lines L1 and L2, which connect the two base stations BS, BSn to the device RNM for administering radio resources.

Here, the disturbed subscriber station MSn transmits the training sequence(s) ma-n and/or the code of the training sequence(s) ma-n as correlation signals. The disturbing base station BS thereby detects the signal of the foreign, disturbed subscriber station MSn, and can simultaneously determine the intensity of this signal. Moreover, the disturbing base station BS can use its antenna arrangement with the antenna elements A1-A4 to determine or estimate the direction from which this signal arrives, and thus the direction in which the disturbed subscriber station MSn is located.

Using the received training sequence(s) ma-n, which are currently formed by a coded pilot signal, the disturbing base station BSn then correspondingly carries out a channel estimate for one or more foreign subscriber stations MSn.

The result in the final analysis is the formation of an error covariance matrix $R_I^{(k)}$ that is used to minimize the disturbing transmitted signal to the disturbed subscriber station MSn. The determination of the error covariance matrix $R_I^{(k)}$ for the purpose of reducing or minimizing the transmit power in the direction of foreign, disturbed subscriber stations MSn is performed in this case in a way comparable to the determination, known per se from DE 198 03 188 A1, of the covariance matrix $R_S^{(k)}$ for maximizing the transmit power in the direction of dedicated subscriber stations MS. The same holds for the determination of corresponding beam-shaping vectors $w^{(k)}$, generalized eigenvalues $\lambda^{(k)}$ and the estimated uplink channel pulse response matrices $H^{(k)}$.

Finally, the ratio $$r(w^{(k)}) = \frac{w^{(k)H} R_S^{(k)} w^{(k)}}{w^{(k)H} R_I^{(k)} w^{(k)}}$$

is maximized, the index k with $1 \leq k \leq K$ and K as the number of the subscriber stations MS to be taken into account. In this case, the beam shaping vectors $w^{(k)}$ are an M-dimensional vector with M (with M=4 in FIG. 3) as the number of the antenna elements A1-A4 of the antenna arrangement of the disturbing base station BS.

The quadratic Hermitian and positive-definite error covariance matrix $R_I^{(k)}$, the number of whose rows and columns corresponds to the number M of the antenna elements A1-A4, is formed from the sum of the total of L error covariance matrices $R_{ad}^{(l)}$ for the individual disturbed subscriber stations MSn of the adjacent radio cells Zn. It holds that:

$$R_I = \sum_{l=1}^{L} R_{ad}^{(l)} \text{ with } R_{ad}^{(l)} = \frac{1}{W} \cdot H^{(l)} H^{(l)H}$$

$H^{(l)}$ corresponding to the estimated uplink channel pulse response matrix of the l-th disturbed subscriber station MSn, and the superscript H marking the transjugation ("Hermitian operation"). In order to improve the accuracy of estimation, the estimates of the spatial error covariance matrix $R_I^{(l)}$ can be undertaken by using a rectangular or exponential window over a plurality of time slots that may stem from different frames. The subscriber-specific contribution can be identified by correlation with the sets, transferred via the communication network, of training sequences ma-n. Consequently, the disturbing base station BS can synthesize a predicted interference error covariance matrix $R_I^{(l)}$ for the downlink DL for the subscriber stations MSn that are active in a downlink time slot DL-ts.

Each base station BSn can automatically transmit all the training sequences ma-n, which are newly allocated in their radio cell zone Z, to the adjacent base stations BS. Alternatively, however, it is also possible to reduce the signaling outlay by specifically transmitting training sequences ma-n when a subscriber station MSn establishes that it is receiving signals from a foreign base station.

The transmission of training sequences ma-n is preferably performed with the aid of a protocol that is, in particular, set up appropriately on the side of the network (RAN/Radio Access Network) of the radio communication system.

The protocol informs the adjacent, disturbing base stations BS at least as to which subscriber stations MSn have been allocated which uplink training sequences ma-n. If the disturbing base station BS receives such a training sequence ma-n, which permits a unique identification, the (disturbing) base station BS can therefore assign this received signal to the (disturbed) foreign subscriber station MSn. The (disturbing) base station BS is therefore capable of initiating an estimate of each contribution to the error covariance matrix which stems from the foreign subscriber station MSn.

In the case of a particularly preferred embodiment, the protocol informs the disturbing base stations BS as to which subscriber stations MSn have been allocated which uplink training sequences ma-n in which uplink time slots UL-ts. In this embodiment, it is assumed that a fixed assignment between uplink time slots UL-ts and downlink time slots DL-ts exists in the radio communication system. This is a preferred embodiment for symmetric services that exhibit equally large traffic loading in both directions of connection, as is the case, for example, in transmitting speech.

If such a fixed assignment cannot be assumed between UL-ts and DL-ts, the protocol of the above-named advantageous embodiment is extended. The BS is now additionally informed as to in which downlink time slots DL-ts the subscriber stations MSn are to receive signals or data from their base station BSn.

The base stations BS, BSn thus administer an association table MEM sketched in FIG. 3, that contains data relating to adjacent subscriber stations MSn, their training sequences ma-n and, preferably, the downlink time slots DL-ts assigned to the latter. Of course, it follows therefrom that the disturbing base station BS receives and administers in the uplink not only the signals of the dedicated subscriber stations MS, but also the signals of the foreign disturbed subscriber stations MSn. In the downlink, by contrast, the signals to the dedicated subscriber stations MS are amplified, and the signals in the direction of the foreign disturbed subscriber stations MSn are attenuated. The set of active subscriber stations MS, MSn to be administered by a base station BS is therefore different in uplink and downlink.

For the case in which the training sequences ma-n are allocated centrally on the network side, the training sequences can also be transmitted directly from the central allocation point, for example the device for allocating radio resources RNM, to the base station BSn, which sets up a communication link, and to possibly disturbing adjacent base stations BS.

In the case of TDD systems, in which the transmission is performed in the same frequency band in uplink and downlink, the spatial covariance matrices can be determined directly in conjunction, in particular, with time slot information that has been communicated. By contrast, in FDD systems (FDD: Frequency Division Duplex) a frequency transformation has to be carried out before the estimated uplink covariance matrices can be used for the application in downlinks.

For the case of adjacent radio cells Zn having a width that is only very small by comparison with the cell of the disturbing base station BS, it is also possible for a subscriber station to be disturbed in a radio cell behind the directly adjacent radio cell Zn of the base station BS. In such scenarios, not only information relating to the subscriber stations MSn of the directly adjacent radio cells Zn is needed, but also relating to the subscriber stations of the more remote radio cells, which are therefore also treated like adjacent radio cells Zn.

The error covariance matrix $R_I^{(l)}$ can advantageously also take account of and include the disturbing interference that is known per se from DE 198 03 188.

Advantageous error covariance matrices follow from the a priori model for two- or three-dimensional isotropic noise in which it is assumed that mutually uncorrelated homogeneous plane waves of equal intensity are irradiated onto the BS from all directions. The associated error covariance matrices can be specified in closed form and stored.

The invention has been described in detail with particular reference to preferred embodiments thereof and examples, but it will be understood that variations and modifications can be effected within the spirit and scope of the invention.

The invention claimed is:

1. A method for data transmission in a radio communication system having at least two base stations and radio stations that are connected in each case to one of the base stations via wireless interfaces, at least a first base station having an antenna arrangement with a plurality of antenna elements and a signal processing device for transmitting and receiving data as a function of direction, comprising:
    transmitting data from the first base station to a first radio station communicating therewith in a cell, concurrently with transmission of data from a second base station adjacent to the first base station, to at least one second radio station communicating therewith in an adjacent cell which is adjacent to the cell;
    determining, at the first base station, whether downlink transmission of the data from the first base station causes a disturbance for the at least one second radio station in the adjacent cell; and
    reducing downlink transmission power of the antenna arrangement of the first base station only in a downlink direction that is directed towards the at least one second radio station in the adjacent cell when it is determined that downlink transmission of the data from the first base station does cause a disturbance for the at least one second radio station in the adjacent cell.

2. The method as claimed in claim 1, further comprising transmitting to the first base station, as the signal information relating to the signal transmitted by the at least one second radio station, at least one training signal of the at least one second radio station.

3. The method as claimed in claim 2, wherein the signal information includes downlink time slots during which the at least one second radio station receives data from the second base station.

4. The method as claimed in claim 2, wherein the signal information includes an uplink time slot of the at least one second radio station.

5. The method as claimed in claim 4, wherein the signal information is transmitted via network devices in the radio communication system.

6. The method as claimed in claim 1, wherein the signal information is transmitted via network devices in the radio communication system.

7. The method as claimed in claim 1, wherein said transmitting of data uses one of an FDD and a TDD mode in at least one of time slots and a multi-slot method.

8. The method as claimed in claim 1, wherein the signal information is transmitted to the first base station one of regularly and after setting up a connection of the second base station to the at least one second radio station.

9. The method as claimed in claim 1, wherein the signal information includes downlink time slots during which the at least one second radio station receives data from the second base station.

10. The method as claimed in claim 1, further comprising taking into account disturbing interference that does not originate from the radio communication system using the spatial error covariance matrix.

11. The method as claimed in claim 1, wherein the radio communication system includes asynchronous switching points, and
    wherein said method further comprises transferring the signal information relating to the training signals and the uplink time slots of the second base station to the first base station when the uplink time slots are used by the first base station as downlink time slots.

12. The method for data transmission in a radio communication system of claim 1, further comprising:
    compensating for disturbance via error covariance matrices that follow from the a priori model for two or three-dimensional noise in a direction of the disturbed radio station, which is adjacent to the disturbing first base station.

13. A method for data transmission in a radio communication system having at least two base stations and radio stations that are connected in each case to one of the base stations via wireless interfaces, at least a first base station having an antenna arrangement with a plurality of antenna elements and a signal processing device for transmitting and receiving data as a function of direction, comprising:
    transmitting data from the first base station to a first radio station communicating therewith in a cell, concurrently with transmission of data from a second base station adjacent to the first base station, to at least one second radio station communicating therewith in an adjacent cell which is adjacent to the cell;
    determining that transmission of the data from the first base station causes a disturbance for the at least one second radio station in the adjacent cell;
    reducing transmission power of the antenna arrangement of the first base station directed towards the at least one second radio station in the adjacent cell which is disturbed, after reception of signal information relating to a signal transmitted by the at least one second radio station and reception of a signal assignable to the at least one second radio station;
    transmitting to the first base station, as the signal information relating to the signal transmitted by the at least one second radio station, at least one training signal of the at least one second radio station, wherein the signal information includes an uplink time slot of the at least one second radio station, and the signal information is transmitted via network devices in the radio communication system; and
    setting a distribution of a spatial transmit power at the first base station based on a spatial error covariance matrix $R_I^{(I)}$ which yields a beam-shaping vector ($w^{(k)}$) as a solution to an optimization problem defined as follows $$r(w^{(k)}) = \frac{w^{(k)H} R_S^{(k)} w^{(k)}}{w^{(k)H} R_I^{(k)} w^{(k)}} = \max!,$$

and
    weighting signals transmitted by the first base station using the beam-shaping vector.

14. The method as claimed in claim 13, further comprising solving the optimization problem by solving a general eigenvalue problem with positive semi-definite Hermitian matrix $R_S^{(k)}$ and positive definite Hermitian matrix $R_I^{(k)}$, $$R_S^{(k)} w^{(k)} = \lambda R_I^{(k)} w^{(k)}$$

to obtain the beam-shaping vector $w^{(k)}$ as an eigenvector relating to a maximum eigenvalue.

15. The method as claimed in claim 14, wherein said transmitting of data uses one of an FDD and a TDD mode in at least one of time slots and a multi-slot method.

16. The method as claimed in claim 15, wherein the signal information is transmitted to the first base station one of regularly and after setting up a connection of the second base station to the at least one second radio station.

17. The method as claimed in claim 16, wherein the signal information includes downlink time slots during which the at least one second radio station receives data from the second base station.

18. The method as claimed in claim 17, further comprising taking into account disturbing interference that does not originate from the radio communication system using the spatial error covariance matrix.

19. The method as claimed in claim 18, wherein the radio communication system includes asynchronous switching points, and
wherein said method further comprises transferring the signal information relating to the training signals and the uplink time slots of the second base station to the first base station when the uplink time slots are used by the first base station as downlink time slots.

20. A method for data transmission in a radio communication system having at least two base stations and radio stations that are connected in each case to one of the base stations via wireless interfaces, at least a first base station having an antenna arrangement with a plurality of antenna elements and a signal processing device for transmitting and receiving data as a function of direction, comprising:
transmitting data from the first base station to a first radio station communicating therewith in a cell, concurrently with transmission of data from a second base station adjacent to the first base station, to at least one second radio station communicating therewith in an adjacent cell which is adjacent to the cell;
determining that transmission of the data from the first base station causes a disturbance for the at least one second radio station in the adjacent cell;
reducing transmission power of the antenna arrangement of the first base station directed towards the at least one second radio station in the adjacent cell which is disturbed, after reception of signal information relating to a signal transmitted by the at least one second radio station and reception of a signal assignable to the at least one second radio station; and
setting a distribution of a spatial transmit power at the first base station based on a spatial error covariance matrix $R_I^{(T)}$ which yields a beam-shaping vector ($w^{(k)}$) as a solution to an optimization problem defined as follows $$r(w^{(k)}) = \frac{w^{(k)H} R_s^{(k)} w^{(k)}}{w^{(k)H} R_I^{(k)} w^{(k)}} = \max!,$$

and
weighting signals transmitted by the first base station using the beam-shaping vector.

21. The method as claimed in claim 20, further comprising solving the optimization problem by solving a general eigenvalue problem with positive semi-definite Hermitian matrix $R_S^{(k)}$ and positive definite Hermitian matrix $R_I^{(k)}$, $$R_S^{(k)} w^{(k)} = \lambda R_I^{(k)} w^{(k)}$$

to obtain the beam-shaping vector $w^{(k)}$ as an eigenvector relating to a maximum eigenvalue.

22. A radio communication system, comprising:
at least first and second base stations;
at least first and second radio stations communicating with the first and second base stations, respectively, via wireless interfaces, the at least first radio station being in a cell and the at least second radio station being in an adjacent cell which is adjacent to the cell; and
at least one antenna arrangement, coupled to the first base station, having a plurality of antenna elements and a signal processing device to transmit and receive data as a function of direction; including transmitting data from the first base station to the first radio station in the cell concurrently with transmission of data from the second base station to the second radio station in the adjacent cell,
wherein when the first base station determines that downlink transmission of data from the first base station disturbs the second radio station in the adjacent cell, the signal processing device reduces downlink transmission power of the antenna arrangement of the first base station only in a downlink direction towards the second radio station in the adjacent cell after reception of signal information relating to a signal transmitted by the second radio station and reception of a signal assignable to the second radio station.

* * * * *